(12) United States Patent
Cariello (10) Patent No.: US 10,769,014 B2
(45) Date of Patent: Sep. 8, 2020

(54) DISPOSABLE PARITY

(71) Applicant: Micron Technology, Inc., Boise, ID (US)

(72) Inventor: Giuseppe Cariello, Boise, ID (US)

(73) Assignee: Micron Technology, Inc., Boise, ID (US)

( * ) Notice: Subject to any disclaimer, the term of this patent is extended or adjusted under 35 U.S.C. 154(b) by 67 days.

(21) Appl. No.: 16/235,385

(22) Filed: Dec. 28, 2018

(65) Prior Publication Data

US 2020/0210282 A1 Jul. 2, 2020

(51) Int. Cl.
*G06F 3/06* (2006.01)
*G06F 11/07* (2006.01)
*G06F 11/10* (2006.01)
*G06F 12/02* (2006.01)

(52) U.S. Cl.
CPC ........ *G06F 11/1068* (2013.01); *G06F 3/0619* (2013.01); *G06F 3/0647* (2013.01); *G06F 3/0658* (2013.01); *G06F 3/0679* (2013.01); *G06F 12/0253* (2013.01)

(58) Field of Classification Search
CPC .. G06F 11/1068; G06F 3/0619; G06F 3/0647; G06F 3/0658; G06F 3/0679; G06F 12/0253
See application file for complete search history.

(56) References Cited

U.S. PATENT DOCUMENTS

| | | | | |
|---|---|---|---|---|
| 2006/0156214 A1* | 7/2006 | Kikutake | ............ | G06F 11/1032 714/801 |
| 2007/0204199 A1* | 8/2007 | Chung | ................. | H03M 13/29 714/763 |
| 2009/0164867 A1* | 6/2009 | Gray | ..................... | H03M 13/13 714/758 |
| 2009/0287882 A1* | 11/2009 | Sun | ..................... | G06F 11/1076 711/114 |
| 2010/0241929 A1* | 9/2010 | Song | ..................... | H03M 13/13 714/763 |
| 2017/0123995 A1* | 5/2017 | Freyensee | ........... | G06F 11/2094 |
| 2019/0073265 A1* | 3/2019 | Brennan | ................. | G06F 3/061 |
| 2019/0102253 A1* | 4/2019 | Televitckiy | ........... | G06F 3/0688 |

* cited by examiner

*Primary Examiner* — Guy J Lamarre
(74) *Attorney, Agent, or Firm* — Schwegman Lundberg & Woessner, P.A.

(57) ABSTRACT

Devices and techniques for disposable parity are described herein. First and second portions of data can be obtained, and respective parity values stored in adjacent memory locations. An entry mapping the respective parity values to the first and second portions of data is updated when the parity values are stored. If an error occurs when writing a portion of data, the mapping entry is used to retrieve the parity data to correct the error. Otherwise, the parity data is discarded.

24 Claims, 5 Drawing Sheets

DISPOSABLE PARITY

BACKGROUND

Memory devices are typically provided as internal, semiconductor, integrated circuits in computers or other electronic devices. There are many different types of memory, including volatile and non-volatile memory.

Volatile memory requires power to maintain its data, and includes random-access memory (RAM), dynamic random-access memory (DRAM), or synchronous dynamic random-access memory (SDRAM), among others.

Non-volatile memory can retain stored data when not powered, and includes flash memory, read-only memory (ROM), electrically erasable programmable ROM (EEPROM), static RAM (SRAM), erasable programmable ROM (EPROM), resistance variable memory, such as phase-change random-access memory (PCRAM), resistive random-access memory (RRAM), or magnetoresistive random-access memory (MRAM), among others.

Flash memory is utilized as non-volatile memory for a wide range of electronic applications. Flash memory devices typically include one or more groups of one-transistor, floating gate or charge trap memory cells that allow for high memory densities, high reliability, and low power consumption.

Two common types of flash memory array architectures include NAND and NOR architectures, named after the logic form in which the basic memory cell configuration of each is arranged. The memory cells of the memory array are typically arranged in a matrix. In an example, the gates of each floating gate memory cell in a row of the array are coupled to an access line (e.g., a word line). In a NOR architecture, the drains of each memory cell in a column of the array are coupled to a data line (e.g., a bit line). In a NAND architecture, the drains of each memory cell in a string of the array are coupled together in series, source to drain, between a source line and a bit line.

Both NOR and NAND architecture semiconductor memory arrays are accessed through decoders that activate specific memory cells by selecting the word line coupled to their gates. In a NOR architecture semiconductor memory array, once activated, the selected memory cells place their data values on bit lines, causing different currents to flow depending on the state at which a particular cell is programmed. In a NAND architecture semiconductor memory array, a high bias voltage is applied to a drain-side select gate (SGD) line. Word lines coupled to the gates of the unselected memory cells of each group are driven at a specified pass voltage (e.g., Vpass) to operate the unselected memory cells of each group as pass transistors (e.g., to pass current in a manner that is unrestricted by their stored data values). Current then flows from the source line to the bit line through each series coupled group, restricted only by the selected memory cells of each group, placing current encoded data values of selected memory cells on the bit lines.

Each flash memory cell in a NOR or NAND architecture semiconductor memory array can be programmed individually or collectively to one or a number of programmed states. For example, a single-level cell (SLC) can represent one of two programmed states (e.g., 1 or 0), representing one bit of data.

However, flash memory cells can also represent one of more than two programmed states, allowing the manufacture of higher density memories without increasing the number of memory cells, as each cell can represent more than one binary digit (e.g., more than one bit). Such cells can be referred to as multi-state memory cells, multi-digit cells, or multi-level cells (MLCs). In certain examples, MLC can refer to a memory cell that can store two bits of data per cell (e.g., one of four programmed states), a triple-level cell (TLC) can refer to a memory cell that can store three bits of data per cell (e.g., one of eight programmed states), and a quad-level cell (QLC) can store four bits of data per cell. MLC is used herein in its broader context, to can refer to any memory cell that can store more than one bit of data per cell (i.e., that can represent more than two programmed states).

Traditional memory arrays are two-dimensional (2D) structures arranged on a surface of a semiconductor substrate. To increase memory capacity for a given area, and to decrease cost, the size of the individual memory cells has decreased. However, there is a technological limit to the reduction in size of the individual memory cells, and thus, to the memory density of 2D memory arrays. In response, three-dimensional (3D) memory structures, such as 3D NAND architecture semiconductor memory devices, are being developed to further increase memory density and lower memory cost.

Such 3D NAND devices often include strings of storage cells, coupled in series (e.g., drain to source), between one or more source-side select gates (SGSs) proximate a source, and one or more drain-side select gates (SGDs) proximate a bit line. In an example, the SGSs or the SGDs can include one or more field-effect transistors (FETs) or metal-oxide semiconductor (MOS) structure devices, etc. In some examples, the strings will extend vertically, through multiple vertically spaced tiers containing respective word lines. A semiconductor structure (e.g., a polysilicon structure) can extend adjacent a string of storage cells to form a channel for the storages cells of the string. In the example of a vertical string, the polysilicon structure can be in the form of a vertically extending pillar. In some examples the string can be "folded," and thus arranged relative to a U-shaped pillar. In other examples, multiple vertical structures can be stacked upon one another to form stacked arrays of storage cell strings.

Memory arrays or devices can be combined together to form a storage volume of a memory system, such as a solid-state drive (SSD), a Universal Flash Storage (UFS™) device, a MultiMediaCard (MMC) solid-state storage device, an embedded MMC device (eMMC™), etc. An SSD can be used as, among other things, the main storage device of a computer, having advantages over traditional hard drives with moving parts with respect to, for example, performance, size, weight, ruggedness, operating temperature range, and power consumption. For example, SSDs can have reduced seek time, latency, or other delay associated with magnetic disk drives (e.g., electromechanical, etc.). SSDs use non-volatile memory cells, such as flash memory cells to obviate internal battery supply requirements, thus allowing the drive to be more versatile and compact.

An SSD can include a number of memory devices, including a number of dies or logical units (e.g., logical unit numbers or LUNs), and can include one or more processors or other controllers performing logic functions required to operate the memory devices or interface with external systems. Such SSDs can include one or more flash memory die, including a number of memory arrays and peripheral circuitry thereon. The flash memory arrays can include a number of blocks of memory cells organized into a number of physical pages. In many examples, the SSDs will also include DRAM or SRAM (or other forms of memory die or other memory structures). The SSD can receive commands from a host in association with memory operations, such as read or write operations to transfer data (e.g., user data and associated integrity data, such as error data and address data, etc.) between the memory devices and the host, or erase operations to erase data from the memory devices.

BRIEF DESCRIPTION OF THE DRAWINGS

In the drawings, which are not necessarily drawn to scale, like numerals can describe similar components in different views. Like numerals having different letter suffixes can represent different instances of similar components. The drawings illustrate generally, by way of example, but not by way of limitation, various embodiments discussed in the present document.

DETAILED DESCRIPTION

Flash memory devices have implemented error correction codes (ECC) to detect errors and, in some instances, recover from them. However, as device geometries continued to shrink and controller complexity increased, a redundant array of independent device (RAIN) was employed. RAIN is conceptually related to the parity redundant array of independent drive (RAID) schemes used to protect hard drive-based storage rather than non-parity RAID because flash devices already used parallelism between devices (e.g., die, blocks, pages, etc.).

Due to limited numbers of flash (e.g., NAND) die in memory devices (e.g., two, four, or eight die), and due to design decisions to include overprovisioning (e.g., the memory device has a capacity about 6.9% greater than its advertised capacity), it is often not feasible to dedicate a die or even a plane to the parity data. To overcome this issue, parity accumulation across multiple pages in a given block has been used. Here, parity is not written together (e.g., at the same time) with protected data, but rather is temporarily accumulated (e.g., in a swap block of the memory device) before being written with the protected data.

Generally, RAIN parity involves mapping defined data segments, such as a block, to a parity slot. The parity slot is generally implemented in a fast volatile memory of a memory controller for the flash device. Device data segments (e.g., pages of the block) are exclusively OR-ed (XORed) with each other as they are added to the parity slot. Often, once one of the set of defined data segments is complete (e.g., a defined grouping of pages for a block are received), the final parity value is flushed to a swap block, or the like. Once the write is completed, such as when the data is written to a block, the parity values from the swap block are generally written to the block as well. In this way, the parity values can be used to reconstruct the data written to the block in the case of error.

Efficient use of memory controller parity slot can be improved for a variety of RAIN techniques, including swapping RAIN. For example, parity can be maintained only during the writing process and discarded once verification that the data is good after being written. This separates the organizational concerns of traditional RAIN parity generation and storage, enabling different organization of the parity generation in the volatile memory of the memory controller, as well as a swap block used to address overflow of the volatile memory.

Disposing of parity data provides data protection that is similar to storing parity data with the data because most of the data loss is caused by physical defects activated during write (e.g., program) operations. Even read failures are likely caused by an error when the data was written. Thus, maintaining parity data until verifying a block after its closure, for example, provides effective protection from data corruption. Further, as the parity data is not stored with the data in the final destination locations (e.g., blocks), there is a reduced consumption of storage space for parity as well as increased write throughput. Additionally, the ability to store parity values in the volatile memory without concern about when or where they will be written to a final destination enables parity values to be stored in the order of calculation, with no need to separate parity values by block, host (e.g., user) data, maintenance (e.g., garbage collection (GC)), etc. found in swapping RAIN parity value management. Additional details and examples are provided below.

Figure 1:
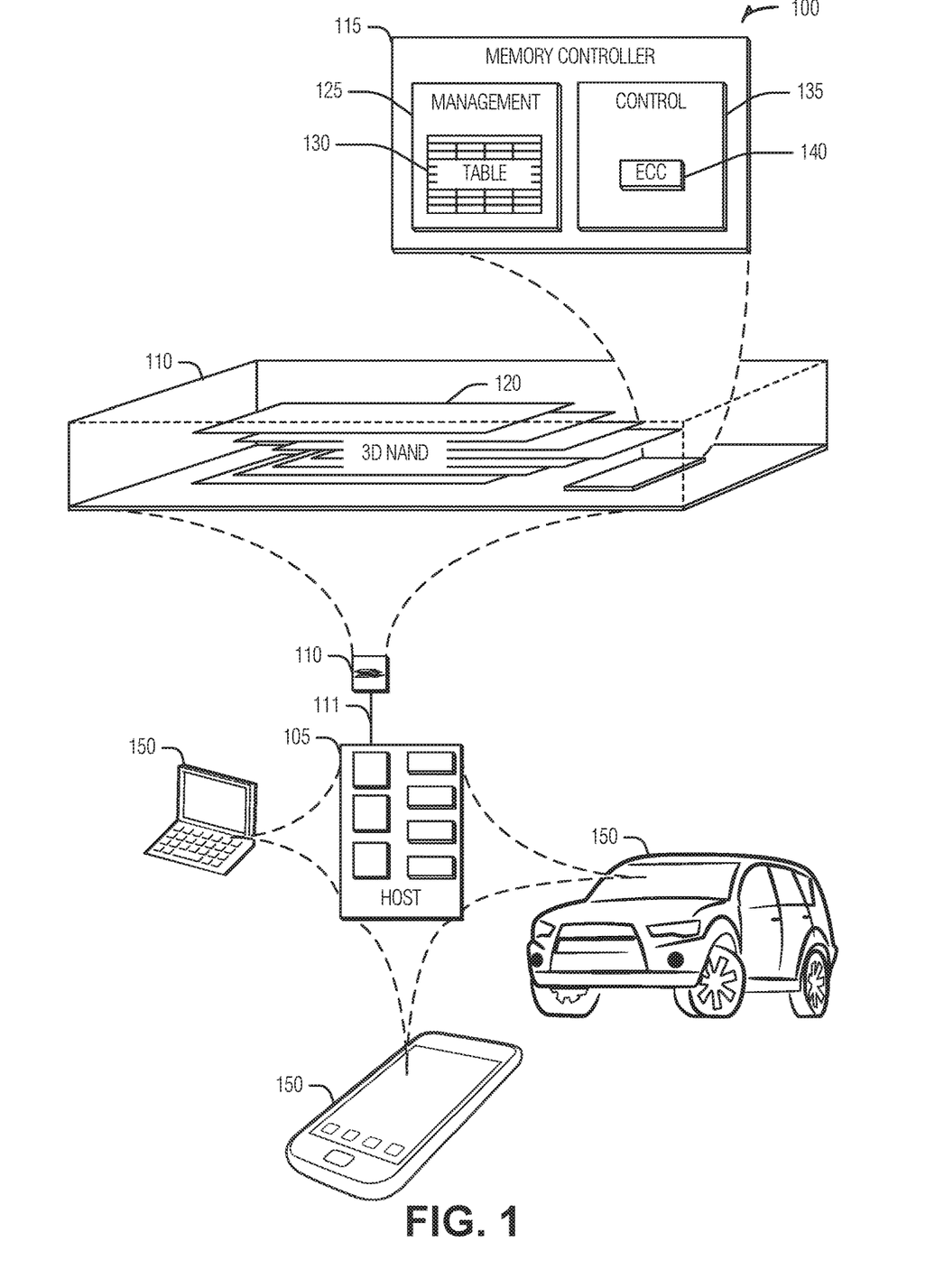
FIG. 1 illustrates an example of an environment including a memory device.

FIG. 1 illustrates an example of an environment 100 including a host device 105 and a memory device 110 configured to communicate over a communication interface. The host device 105 or the memory device 110 can be included in a variety of products 150, such as Internet of Things (IoT) devices (e.g., a refrigerator or other appliance, sensor, motor or actuator, mobile communication device, automobile, drone, etc.) to support processing, communications, or control of the product 150.

The memory device 110 includes a memory controller 115 and a memory array 120 including, for example, a number of individual memory die (e.g., a stack of three-dimensional (3D) NAND die). In 3D architecture semiconductor memory technology, vertical structures are stacked, increasing the number of tiers, physical pages, and accordingly, the density of a memory device (e.g., a storage device). In an example, the memory device 110 can be a discrete memory or storage device component of the host device 105. In other examples, the memory device 110 can be a portion of an integrated circuit (e.g., system on a chip (SOC), etc.), stacked or otherwise included with one or more other components of the host device 105. In these examples, the memory device 110 communicates with host device 105 components via an interlink 111, such as a bus. Thus, as described herein, a host, or host device 105 operation is distinct from those of the memory device 110, even when the memory device 110 is integrated into the host device 105.

One or more communication interfaces (e.g., the interlink 111) can be used to transfer data between the memory device 110 and one or more other components of the host device 105, such as a Serial Advanced Technology Attachment (SATA) interface, a Peripheral Component Interconnect Express (PCIe) interface, a Universal Serial Bus (USB) interface, a Universal Flash Storage (UFS) interface, an eMMC™ interface, or one or more other connectors or interfaces. The host device 105 can include a host system, an electronic device, a processor, a memory card reader, or one or more other electronic devices external to the memory device 110. In some examples, the host 105 can be a machine having some portion, or all, of the components discussed in reference to the machine 500 of FIG. 5.

The memory controller 115 can receive instructions from the host 105, and can communicate with the memory array 120, such as to transfer data to (e.g., write or erase) or from (e.g., read) one or more of the memory cells, planes, sub-blocks, blocks, or pages of the memory array 120. The memory controller 115 can include, among other things, circuitry or firmware, including one or more components or integrated circuits. For example, the memory controller 115 can include one or more memory control units, circuits, or components configured to control access across the memory array 120 and to provide a translation layer between the host 105 and the memory device 110.

The memory manager 125 can include, among other things, circuitry or firmware, such as several components or integrated circuits associated with various memory management functions. For purposes of the present description example memory operation and management functions will be described in the context of NAND memory. Persons skilled in the art will recognize that other forms of non-volatile memory can have analogous memory operations or management functions. Such NAND management functions include wear leveling (e.g., garbage collection or reclamation), error detection or correction, block retirement, or one or more other memory management functions. The memory manager 125 can parse or format host commands (e.g., commands received from a host) into device commands (e.g., commands associated with operation of a memory array, etc.), or generate device commands (e.g., to accomplish various memory management functions) for the array controller 135 or one or more other components of the memory device 110.

The memory manager 125 can include a set of management tables 130 configured to maintain various information associated with one or more component of the memory device 110 (e.g., various information associated with a memory array or one or more memory cells coupled to the memory controller 115). For example, the management tables 130 can include information regarding block age, block erase count, error history, or one or more error counts (e.g., a write operation error count, a read bit error count, a read operation error count, an erase error count, etc.) for one or more blocks of memory cells coupled to the memory controller 115. In certain examples, if the number of detected errors for one or more of the error counts is above a threshold, the bit error can be referred to as an uncorrectable bit error. The management tables 130 can maintain a count of correctable or uncorrectable bit errors, among other things. In an example, the management tables 103 can include translation tables or a L2P mapping.

The array controller 135 can include, among other things, circuitry or components configured to control memory operations associated with writing data to, reading data from, or erasing one or more memory cells of the memory device 110 coupled to the memory controller 115. The memory operations can be based on, for example, host commands received from the host 105, or internally generated by the memory manager 125 (e.g., in association with wear leveling, error detection or correction, etc.).

The array controller 135 can include an error correction code (ECC) component 140, which can include, among other things, an ECC engine or other circuitry configured to detect or correct errors associated with writing data to or reading data from one or more memory cells of the memory device 110 coupled to the memory controller 115. The memory controller 115 can be configured to actively detect and recover from error occurrences (e.g., bit errors, operation errors, etc.) associated with various operations or storage of data based on the ECC data maintained by the array controller 135. This enables the memory controller 115 to maintain integrity of the data transferred between the host 105 and the memory device 110 or maintain integrity of stored data. Part of this integrity maintenance can include removing (e.g., retiring) failing memory resources (e.g., memory cells, memory arrays, pages, blocks, etc.) to prevent future errors.

RAIN is another technique that can be employed by the memory device 110 to maintain data integrity. The array controller 135 can be arranged to implement RAIN parity data generation and storage in the array 120. Swap RAIN is a technique to reduce parity data impact on memory over-provisioning. Swap RAIN can increase memory resources used to store parity data during writes, and can lead to increased latencies during its swapping phase. Disposable parity provides a solution to these issues.

In disposable parity, parity data is discarded after a write is verified. Write verification can occur, for example, when a block is closed (e.g., there is no more writing available to the block because it is full). Thus, in contrast to traditional parity-based data integrity techniques, the parity data is not stored with the data. This enables efficient parity data handling without maintaining a connection between the parity handling data structures and the final storage location of the data. For example, interim parity values for one block can be mixed with interim parity values for another block in the volatile memory of the array controller 135. Further, the type of source data (e.g., a host data block or a maintenance data block) does not matter with regard to this mixing.

The mixed interim parity value storage for parity data described herein provides for more efficient use of volatile memory in the array controller 135. This enables smaller volatile memories, reducing power and expense for the array controller 135. Further, because the need for the parity data is rare, the interim parity data storage can be optimized to increase write throughput and recovery of the parity data can be performed during lulls in writing. This arrangement is efficient under many current workloads, such as a user device that is frequently woken and used intermittently, such as loading web pages on a mobile phone or the like. The periods of low storage activity enable the memory device 110 to recover the parity data from a write optimized structure without impacting the user experience.

To implement disposable parity management, the array controller 135 is arranged to obtain—e.g., receive from the host 105 via the memory controller 115—a first portion of data. In an example, the first portion of data is a block as defined by the memory device 110 (e.g., as provided by the structure of the array 120). Additional structures can include superblocks (e.g., a block from each die of the array 120), partial super blocks (e.g., less than a superblock but more than a block), or other structures into which parity data would traditional be saved. Thus, if per-page parity was used, then a page would constitute the structure. In an example, the first data portion is a user data block received at the NAND device. A user data block, also called a host data block, is received from the host 105, and is not generated by the memory device 110 itself. In cases where the memory device 110 is not managed (e.g., duties of the memory controller 115 are external to the memory device 110), the user data block is defined such that it does not involve maintenance data (such as logical-to-physical (L2P) mapping, bad-block tables, etc.) related to running the memory device 110.

The array controller 135 is arranged to store a first parity value for the first portion of data. Here, the first parity value is stored a first memory location. In an example, the first parity value is an exclusive OR (XOR) between pages of a block for the first portion of data. The array controller 135 can be configured to generate the parity value. This is typical, however, the parity value can be generated by an external entity, such as the memory controller 115, or the host 105.

The array controller 135 is arranged to update a data-to-parity table a first entry that includes a mapping between the first portion of data and the first memory location. As noted above, the traditional parity data to destination storage organization is not maintained. Thus, the data-to-parity table, or other data structure, tracks which part of the first portion of data (e.g., which page in a block) has parity data corresponding to which parity slot in the volatile memory. Further, when a swap block, or other flash-based interim storage is employed, the data-to-parity table can track the parity data in the swap block as well. The data-to-parity table can include a table data structure per virtual block. Here, the virtual block is a data segment the size of the block but does not necessarily correspond to a specific physical block in the array 120.

In an example, the content of each entry of the table specific to the virtual block is a physical address of the parity value, whether it is in the volatile memory of the array controller 135 or in a swap block. In an example, the entry also includes an identifier (e.g., offset) of a part of the first portion of data to which the parity value corresponds. Thus, if the parity value corresponds to the first page of the first portion of data, then the entry includes an identifier of the first page. In an example, the identifier is not part of the entry itself, but defined by a position of the entry in the table. Thus, the first page can correspond to the first entry, the second page to the second entry, and so on. This can reduce the size of the virtual block table in the data-to-parity table.

The array controller 135 is arranged to obtain a second portion of data. In an example, the second portion of data is also a block as defined the memory device. In an example, the second data portion is a garbage collection (GC) block, or other maintenance data block, as opposed to the user data block of the first portion of data. This ability to mix the data types arise from the data-to-parity table. In an example, the second portion of data is not a block. For example, the second portion of data can correspond to a superblock while the first portion of data is a block. Again, the separation of the parity data from the physical devices in the array to which the fata is written provides for great flexibility in the parity management.

The array controller 135 is arranged to store, a second memory location that is adjacent to the first memory location, a second parity value for the second portion of data. Here, adjacent means in a next available slot. Thus, for example, if the parity value slot size is one page, then the adjacent location is the next page in the parity slot memory of the array controller 135. Once stored, the array controller 135 is arranged to update the data-to-parity table with a second entry that includes a mapping between the second portion of data and the second memory location.

In an example, the first memory location and the second memory location are originally stored in volatile memory of the array controller 135. In an example, the first memory location and second memory location are segments of a circular buffer. Thus, the parity slot memory can be managed as a circular buffer, with a pointer to the current head of the buffer. The next parity value that is stored is put in the volatile memory at the pointer, and the pointer is then incremented to the next slot. In an example, an additional pointer can point to the tail of the buffer. Periodically, the array controller 135 can write data from the tail to flash storage (e.g., a swap block to which the parity data is flushed) in the array. The flash storage can be SLC encoded to enable faster writes. As slots (e.g., segments) are written to the flash storage, the tail pointer is incremented.

In an example, the array controller 135 is arranged to flush the volatile memory to the flash storage in response to a trigger. In an example, the trigger is a filling threshold of the volatile memory. In the example where the volatile memory is arranged as a circular buffer, the filling threshold can be a number of slots that separate the head and tail pointers. Thus, when the head pointer is within the threshold number of slots to the tail pointer, the array control 135 performs the flush.

The array controller 135 is arranged to suspend flushing when it receives a command to increase performance. Such a command can originate from the host 105 or from the memory controller 115. Because flushing can interrupt parity value storage, it is possible that write-throughput is impacted. The suspension of flushing thus entails overwriting parity values that have not yet been committed to the non-volatile flash storage and increases the risk that the pertinent parity values will not exist if they are needed in the event of a write error.

The array controller 135 is arranged to update entries of the data-to-parity table that correspond to flushed parity values to point to the non-volatile memory. Thus, the data-to-parity table is kept current with a current location of the parity value whenever the parity value is moved.

The array controller 135 is arranged to detect an error during a write of the first portion of data. The error can be detected upon the write itself, or upon verification following the write. In an example, the verification is a block verification.

Upon detection of the error, the array controller 135 is arranged to retrieve the first parity value (e.g., via a lookup in the data-to-parity table). The array controller 135 can be arranged to correct the error with the first parity value, or to provide the first parity value to another entity (e.g., the memory controller 115 or the host 105) to correct the error. In the case where the command to increase performance is received by the array controller 135, the ability to retrieve the first parity value is limited to the rate at which the volatile memory is filling. Thus, if the error is detected too late (e.g., upon block verification rather than during the write itself), then error correction using the first parity value will not occur.

Once the write of the first portion of data or the second portion of data is complete, the first memory location and second memory location are discarded. Thus, the parity data is kept only until the successful write, including correcting any errors detected as part of the write. For example, if there was no error before the successful write of the second portion of data, the second parity value is discarded without being used.

Maintaining the parity data until a successful write is detected provides several benefits. For example, parity data does not take up small in the array, aside from the use of a swap block in some cases, and thus helps reduce overprovisioning of the memory device 110. Additionally, with no need to efficiently map virtual block data to physical blocks, the structure of the interim parity data storage can be optimized for write throughput, providing a better user experience. Further, the efficient organization of the interim parity value storage enables smaller volatile memory in the array controller 135, which reduces power and complexity that results in more efficient operation.

The memory array 120 can include several memory cells arranged in, for example, a number of devices, planes, sub-blocks, blocks, or pages. As one example, a 48 GB TLC NAND memory device can include 18,592 bytes (B) of data per page (16,384+2208 bytes), 1536 pages per block, 548 blocks per plane, and 4 or more planes per device. As another example, a 32 GB MLC memory device (storing two bits of data per cell (i.e., 4 programmable states)) can include 18,592 bytes (B) of data per page (16,384+2208 bytes), 1024 pages per block, 548 blocks per plane, and 4 planes per device, but with half the required write time and twice the program/erase (P/E) cycles as a corresponding TLC memory device. Other examples can include other numbers or arrangements. In some examples, a memory device, or a portion thereof, can be selectively operated in SLC mode, or in a desired MLC mode (such as TLC, QLC, etc.).

In operation, data is typically written to or read from the NAND memory device 110 in pages, and erased in blocks. However, one or more memory operations (e.g., read, write, erase, etc.) can be performed on larger or smaller groups of memory cells, as desired. The data transfer size of a NAND memory device 110 is typically referred to as a page, whereas the data transfer size of a host is typically referred to as a sector.

Although a page of data can include a number of bytes of user data (e.g., a data payload including a number of sectors of data) and its corresponding metadata, the size of the page often refers only to the number of bytes used to store the user data. As an example, a page of data having a page size of 4 KB can include 4 KB of user data (e.g., 8 sectors assuming a sector size of 512 B) as well as a number of bytes (e.g., 32 B, 54 B, 224 B, etc.) of metadata corresponding to the user data, such as integrity data (e.g., error detecting or correcting code data), address data (e.g., logical address data, etc.), or other metadata associated with the user data.

Different types of memory cells or memory arrays 120 can provide for different page sizes, or can require different amounts of metadata associated therewith. For example, different memory device types can have different bit error rates, which can lead to different amounts of metadata necessary to ensure integrity of the page of data (e.g., a memory device with a higher bit error rate can require more bytes of error correction code data than a memory device with a lower bit error rate). As an example, a multi-level cell (MLC) NAND flash device can have a higher bit error rate than a corresponding single-level cell (SLC) NAND flash device. As such, the MLC device can require more metadata bytes for error data than the corresponding SLC device.

Figure 2:
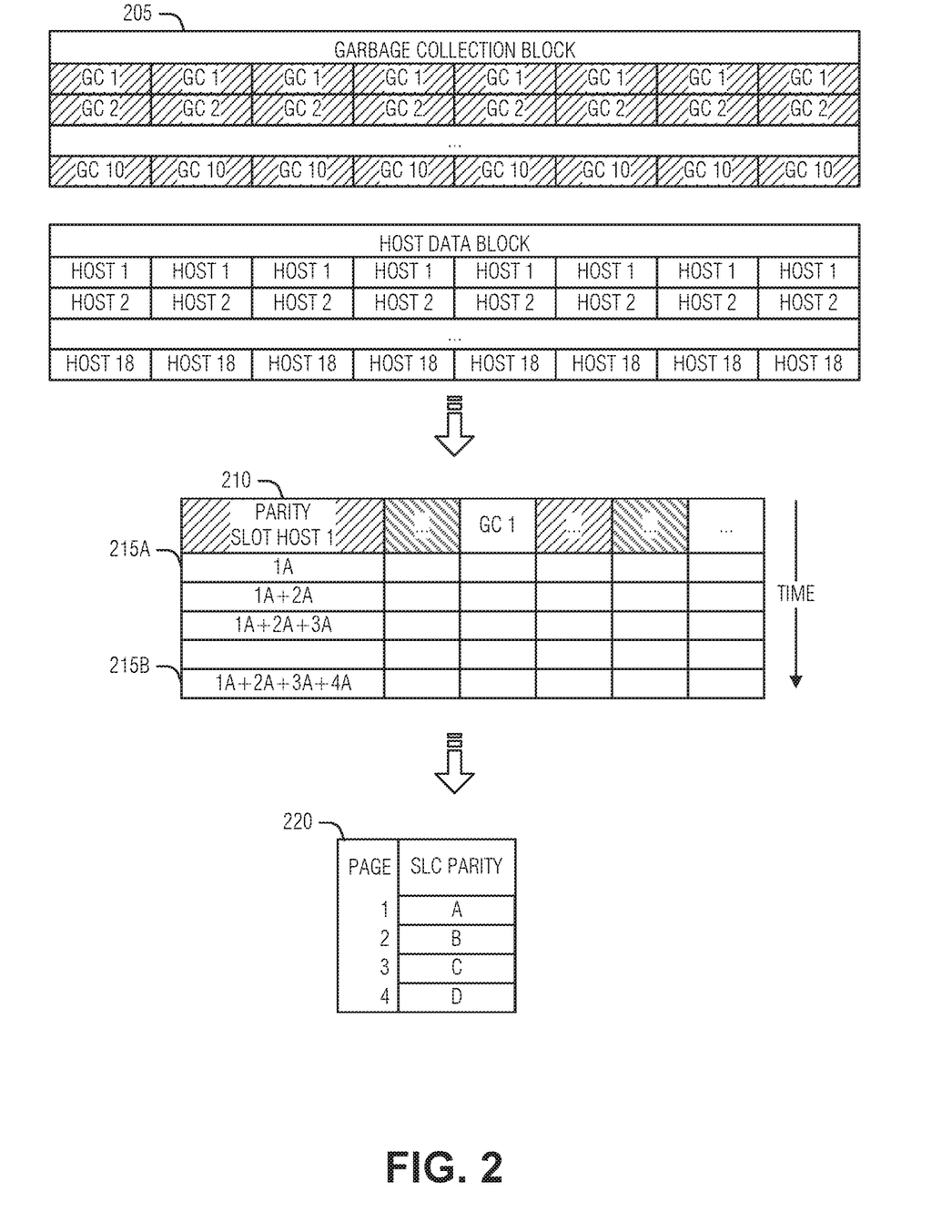
FIG. 2 illustrates an example of a parity mapping for a redundant array of independent NAND (RAIN).

FIG. 2 illustrates an example of a parity mapping for a RAIN. Blocks (e.g., GC block 205) are mapped to parity slots (e.g., parity slot 210) in volatile memory where parity values are accumulated. The mapping is often based on a direct manipulation of an attribute of the block 205 to avoid the overhead of tracking the parity slot 210 to logical block mapping. Generally, the parity slot 210 is sized for a smallest unit of parity. Thus, where pages are XORed for parity, the parity slot 210 is the size of one page.

In operation, the content of the parity slot 210 changes over time as additional pages of the block 205 are added. Thus, the parity slot value at a first time 215A starts with the first page of block A (e.g., host data 1). As time progresses, the value in the parity slot 210 is changed to be a combination of a previous value and a current page of the logical block. Thus, the XOR result of pages 1A and 2A is XORed with the page 3A when page 3A arrives. This continues, if there is a page for the logical block, until the group is done, or some other criteria is met and the parity slot value at a second time 215B is flushed to a swap block 220, at a page corresponding to the block. After a flush, the parity slot 210 is reset (e.g., erased, emptied, etc.) and parity accumulation begins again.

The swap block 220 is typically flash storage used as a workspace for the parity accumulation. When the block 205 is completely written to physical blocks (e.g., a write is complete), then the parity data for the block 205 is typically written to the physical blocks as well to collocate it with the data to which it pertains. Typically, the swap block 220 is SLC encoded for speed, as opposed to the MLC (e.g., TLC) encoding of the physical blocks ultimately holding the data or parity data.

As illustrated, the empty cells for the parity slot 210 represent time increments in which the value in the parity slot 210 did not change. It is this feature that can lead to a need for large memory controller memories (e.g., to maintain parity slots for all of the logical blocks A, B, C, and D) being written.

Figure 3:
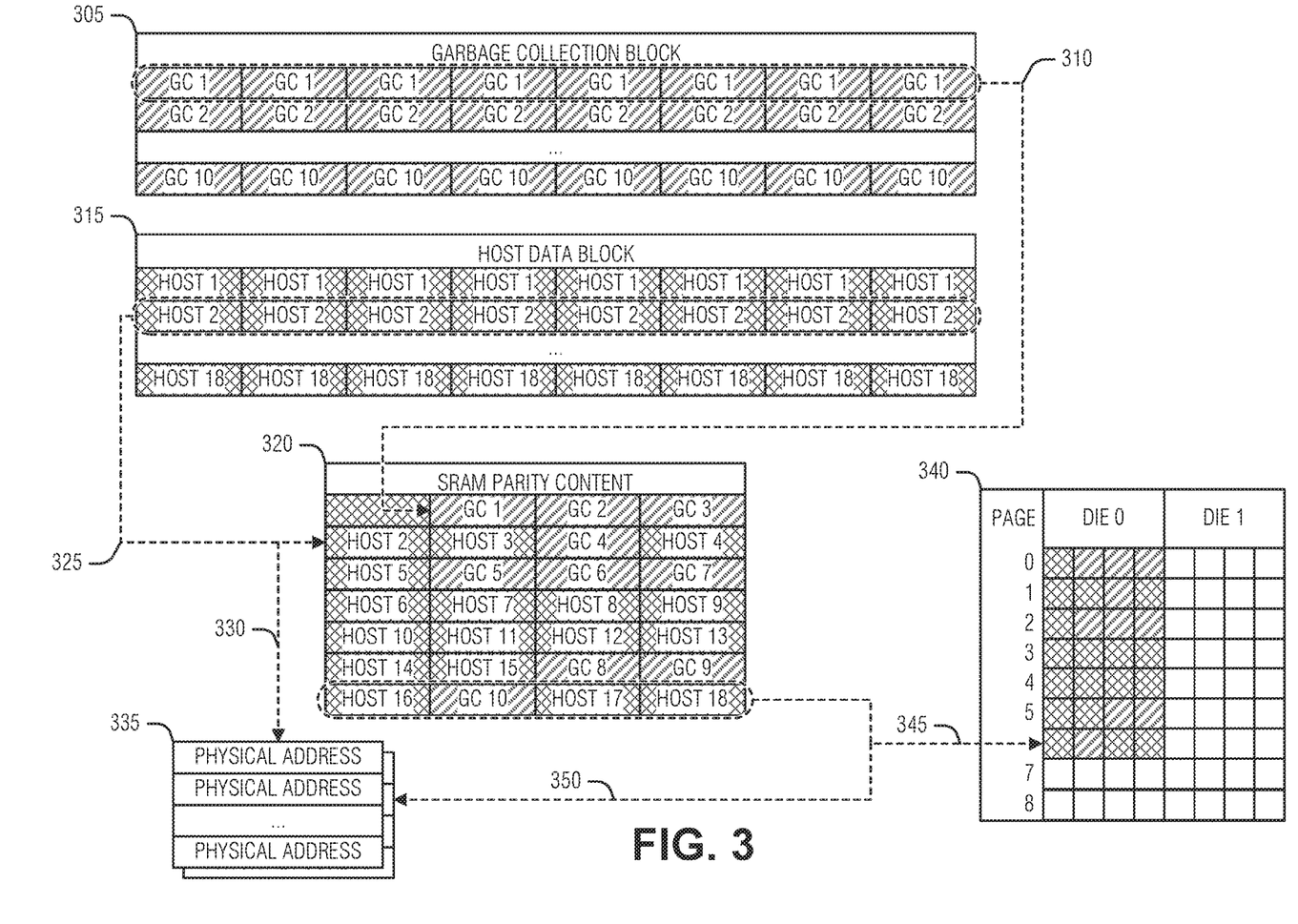
FIG. 3 illustrates an example of a disposable parity mapping for a RAIN.

FIG. 3 illustrates an example of a disposable parity mapping for a RAIN. In contrast to the defined block to slot mapping illustrated in FIG. 2, here, the volatile memory 320 mixes parity values for the different blocks. Thus, the pages from the GC block 305 are XORed (operation 310) and stored in the volatile memory 320 as are the pages from host (e.g., user) data blocks 315 (e.g., XORed in operation 325).

Periodically, portions of the volatile memory 320 are flushed (e.g., dumped) (operation 345) to a swap block 340. Note that the flush 345 copies data from the volatile memory 320 without regard to what type of data it is (e.g., both host and GC parity data is flushed 345).

When a parity value is first stored, an entry is created (operation 330) in the data-to-parity mapping data structure 335. The entry includes an address of the parity value (e.g., a memory address in the volatile memory 320). If the parity value is moved (e.g., to the swap block 340), the entry is updated 345 with the address in the swap block of the parity value.

As noted above, the parity values in the volatile memory 320 or the swap block 340 are not persisted beyond a successful write of the blocks 305 or 315. Thus, the parity values are disposable.

The disposable nature of the parity values permits many other possible configurations. Because of this, it is possible to manage the volatile memory 320 as a circular buffer that continues to accumulate parity values during busy times and flush it in during idle periods. In many usage models, this strategy is effective because they include significant idle periods. However, when write performance is important, the parity values can be discarded (e.g., overwritten) and no flushing occur to trade reliability for performance. In an example, critical data (e.g., as tagged by the host) can trigger parity flushing of affected page-lines with minimal performance impact during when the device in the high-performance state.

In an example, data-to-parity mapping data structure updates are postponed until idle periods to further increase write throughput. In an example, the swap block 340 can be managed as a circular buffer.

The illustrated structures provide a flexible platform for RAIN parity management that automatically adapts to the number of open blocks. Further, if desired for critical data, the parity values can be re-mapped to the physical destination structures of the blocks 305 or 315 to store the parity values, providing another level of flexibility over traditional RAIN parity management techniques.

Figure 4:
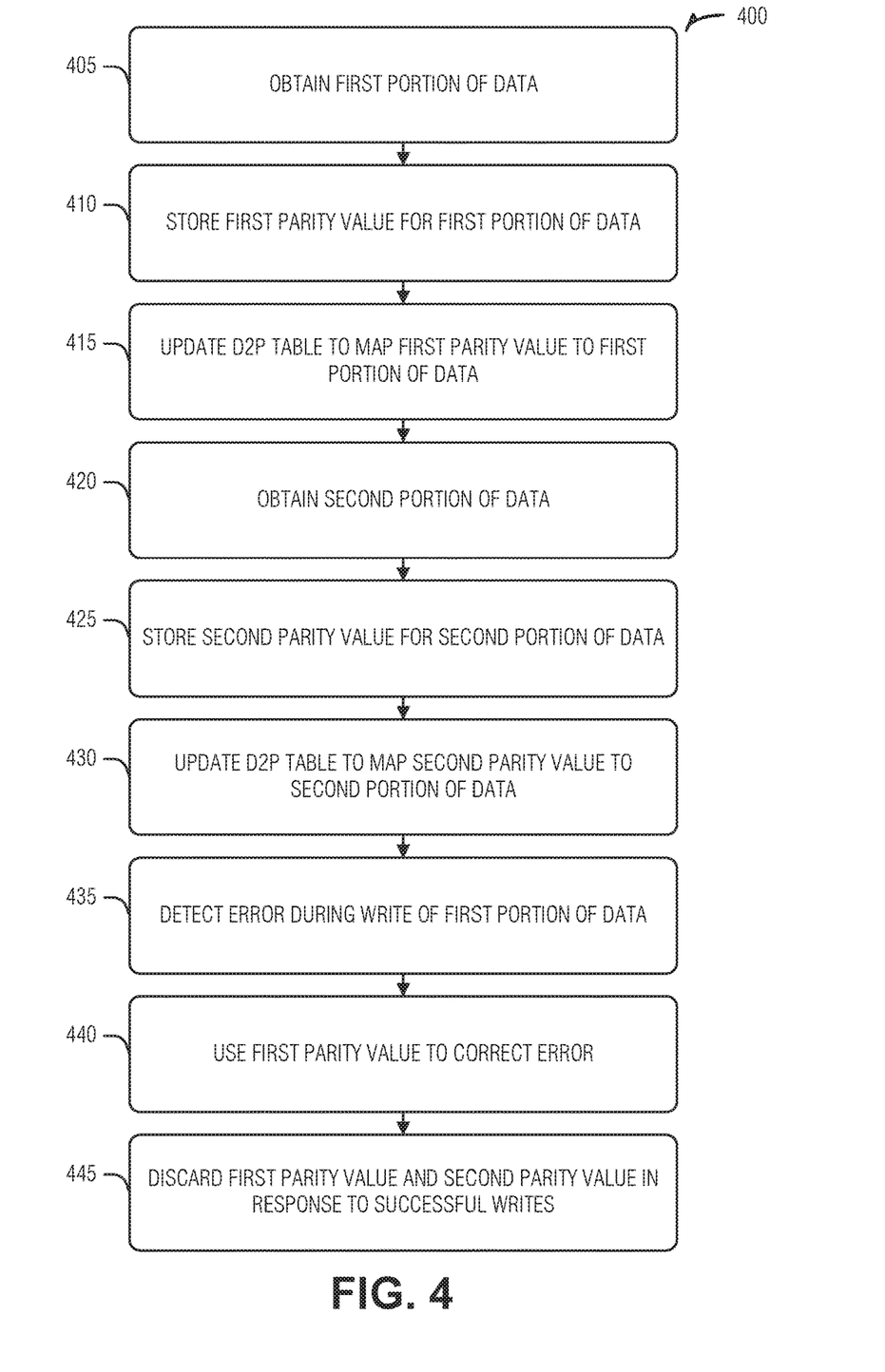
FIG. 4 illustrates a flowchart of a method for disposable parity.

FIG. 4 illustrates a flowchart of a method 400 for disposable parity. The operations of the method 400 are performed by computer hardware, such as that described above (e.g., a memory controller, an array controller, etc.) or below (e.g., processing circuitry).

At operation 405, a first portion of data is obtained. In an example, the first portion of data is a block as defined by a NAND device to which the first portion of data is being written. In an example, the first data portion is a user data block received at the NAND device.

At operation 410, a first parity value for the first portion of data is stored in a first memory location. In an example, the first parity value is an exclusive OR (XOR) between pages of a block for the first portion of data.

At operation 415, a data-to-parity table is updated with a first entry that includes a mapping between the first portion of data and the first memory location.

At operation 420, a second portion of data is obtained. In an example, the second portion of data is a block as defined by a NAND device to which the second portion of data is being written. In an example, the second data portion is a garbage collection (GC) block, as opposed to a user data block.

At operation 425, a second parity value for the second portion of data is stored in a second memory location that is adjacent to the first memory location.

At operation 430, the data-to-parity table is updated with a second entry that includes a mapping between the second portion of data and the second memory location.

In an example, the first memory location and the second memory location are originally stored in volatile memory (e.g., of an array controller of the NAND device). In an example, the first memory location and second memory location are segments of a circular buffer.

At operation 435, an error is detected during a write of the first portion of data.

At operation 440, the first parity value is used, via a lookup in the data-to-parity table, to correct the error.

At operation 445, the first memory location and second memory location are discarded in response to a successful write of the first data portion and the second data portion. In an example, there was no error before the successful write of the second portion of data. Here, the second parity value was discarded without being used.

In an example, the method 400 can include the additional operation of flushing the volatile memory to a non-volatile memory in response to a trigger. In an example, the trigger is a filling threshold of the volatile memory. Upon a flush of the volatile memory, the method 400 can include the operation of updating the entries of the data-to-parity table that correspond to flushed parity values to point to the non-volatile memory.

In an example, the method 400 can include the additional operation of receiving a command to increase performance of the NAND device. In an example, flushing the volatile memory to the non-volatile memory is suspended in response to the command to increase performance. In an example, the volatile memory is cleared in response to the trigger.

Figure 5:
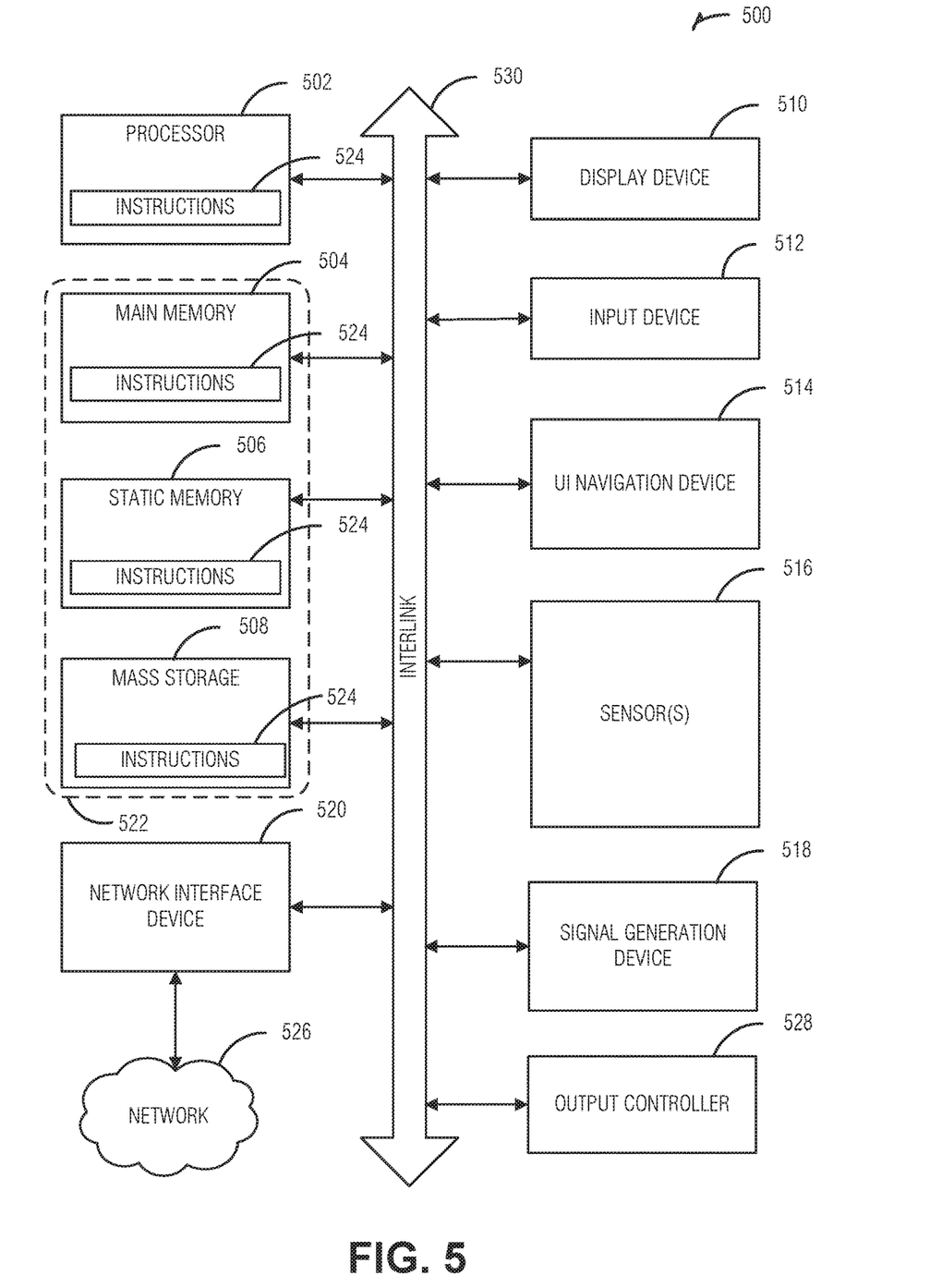
FIG. 5 is a block diagram illustrating an example of a machine upon which one or more embodiments can be implemented.

FIG. 5 illustrates a block diagram of an example machine 500 upon which any one or more of the techniques (e.g., methodologies) discussed herein can perform. In alternative embodiments, the machine 500 can operate as a standalone device or can be connected (e.g., networked) to other machines. In a networked deployment, the machine 500 can operate in the capacity of a server machine, a client machine, or both in server-client network environments. In an example, the machine 500 can act as a peer machine in peer-to-peer (P2P) (or other distributed) network environment. The machine 500 can be a personal computer (PC), a tablet PC, a set-top box (STB), a personal digital assistant (PDA), a mobile telephone, a web appliance, an IoT device, automotive system, or any machine capable of executing instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein, such as cloud computing, software as a service (SaaS), other computer cluster configurations.

Examples, as described herein, can include, or can operate by, logic, components, devices, packages, or mechanisms. Circuitry is a collection (e.g., set) of circuits implemented in tangible entities that include hardware (e.g., simple circuits, gates, logic, etc.). Circuitry membership can be flexible over time and underlying hardware variability. Circuitries include members that can, alone or in combination, perform specific tasks when operating. In an example, hardware of the circuitry can be immutably designed to carry out a specific operation (e.g., hardwired). In an example, the hardware of the circuitry can include variably connected physical components (e.g., execution units, transistors, simple circuits, etc.) including a computer readable medium physically modified (e.g., magnetically, electrically, moveable placement of invariant massed particles, etc.) to encode instructions of the specific operation. In connecting the physical components, the underlying electrical properties of a hardware constituent are changed, for example, from an insulator to a conductor or vice versa. The instructions enable participating hardware (e.g., the execution units or a loading mechanism) to create members of the circuitry in hardware via the variable connections to carry out portions of the specific tasks when in operation. Accordingly, the computer readable medium is communicatively coupled to the other components of the circuitry when the device is operating. In an example, any of the physical components can be used in more than one member of more than one circuitry. For example, under operation, execution units can be used in a first circuit of a first circuitry at one point in time and reused by a second circuit in the first circuitry, or by a third circuit in a second circuitry at a different time.

The machine (e.g., computer system) 500 (e.g., the host device 105, the memory device 110, etc.) can include a hardware processor 502 (e.g., a central processing unit (CPU), a graphics processing unit (GPU), a hardware processor core, or any combination thereof, such as the memory controller 115, etc.), a main memory 504 and a static memory 506, some or all of which can communicate with each other via an interlink (e.g., bus) 508. The machine 500 can further include a display unit 510, an alphanumeric input device 512 (e.g., a keyboard), and a user interface (UI) navigation device 514 (e.g., a mouse). In an example, the display unit 510, input device 512 and UI navigation device 514 can be a touch screen display. The machine 500 can additionally include a storage device (e.g., drive unit) 508, a signal generation device 518 (e.g., a speaker), a network interface device 520, and one or more sensors 516, such as a global positioning system (GPS) sensor, compass, accelerometer, or other sensor. The machine 500 can include an output controller 528, such as a serial (e.g., universal serial bus (USB), parallel, or other wired or wireless (e.g., infrared (IR), near field communication (NFC), etc.) connection to communicate or control one or more peripheral devices (e.g., a printer, card reader, etc.).

The storage device 508 can include a machine readable medium 522 on which is stored one or more sets of data structures or instructions 524 (e.g., software) embodying or utilized by any one or more of the techniques or functions described herein. The instructions 524 can also reside, completely or at least partially, within the main memory 504, within static memory 506, or within the hardware processor 502 during execution thereof by the machine 500. In an example, one or any combination of the hardware processor 502, the main memory 504, the static memory 506, or the storage device 508 can constitute the machine readable medium 522.

While the machine readable medium 522 is illustrated as a single medium, the term "machine readable medium" can include a single medium or multiple media (e.g., a centralized or distributed database, or associated caches and servers) configured to store the one or more instructions 524.

The term "machine readable medium" can include any medium that is capable of storing, encoding, or carrying instructions for execution by the machine 500 and that cause the machine 500 to perform any one or more of the techniques of the present disclosure, or that is capable of storing, encoding or carrying data structures used by or associated with such instructions. Non-limiting machine readable medium examples can include solid-state memories, and optical and magnetic media. In an example, a massed machine readable medium comprises a machine-readable medium with a plurality of particles having invariant (e.g., rest) mass. Accordingly, massed machine-readable media are not transitory propagating signals. Specific examples of massed machine readable media can include: non-volatile memory, such as semiconductor memory devices (e.g., Electrically Programmable Read-Only Memory (EPROM), Electrically Erasable Programmable Read-Only Memory (EEPROM)) and flash memory devices; magnetic disks, such as internal hard disks and removable disks; magneto-optical disks; and CD-ROM and DVD-ROM disks.

The instructions 524 (e.g., software, programs, an operating system (OS), etc.) or other data are stored on the storage device 521, can be accessed by the memory 504 for use by the processor 502. The memory 504 (e.g., DRAM) is typically fast, but volatile, and thus a different type of storage than the storage device 521 (e.g., an SSD), which is suitable for long-term storage, including while in an "off" condition. The instructions 524 or data in use by a user or the machine 500 are typically loaded in the memory 504 for use by the processor 502. When the memory 504 is full, virtual space from the storage device 521 can be allocated to supplement the memory 504; however, because the storage 521 device is typically slower than the memory 504, and write speeds are typically at least twice as slow as read speeds, use of virtual memory can greatly reduce user experience due to storage device latency (in contrast to the memory 504, e.g., DRAM). Further, use of the storage device 521 for virtual memory can greatly reduce the usable lifespan of the storage device 521.

In contrast to virtual memory, virtual memory compression (e.g., the Linux® kernel feature "ZRAM") uses part of the memory as compressed block storage to avoid paging to the storage device 521. Paging takes place in the compressed block until it is necessary to write such data to the storage device 521. Virtual memory compression increases the usable size of memory 504, while reducing wear on the storage device 521.

Storage devices optimized for mobile electronic devices, or mobile storage, traditionally include MMC solid-state storage devices (e.g., micro Secure Digital (microSD™) cards, etc.). MMC devices include a number of parallel interfaces (e.g., an 8-bit parallel interface) with a host device and are often removable and separate components from the host device. In contrast, eMMC™ devices are attached to a circuit board and considered a component of the host device, with read speeds that rival serial ATA™ (Serial AT (Advanced Technology) Attachment, or SATA) based SSD devices. However, demand for mobile device performance continues to increase, such as to fully enable virtual or augmented-reality devices, utilize increasing networks speeds, etc. In response to this demand, storage devices have shifted from parallel to serial communication interfaces. Universal Flash Storage (UFS) devices, including controllers and firmware, communicate with a host device using a low-voltage differential signaling (LVDS) serial interface with dedicated read/write paths, further advancing greater read/write speeds.

The instructions 524 can further be transmitted or received over a communications network 526 using a transmission medium via the network interface device 520 utilizing any one of a number of transfer protocols (e.g., frame relay, internet protocol (IP), transmission control protocol (TCP), user datagram protocol (UDP), hypertext transfer protocol (HTTP), etc.). Example communication networks can include a local area network (LAN), a wide area network (WAN), a packet data network (e.g., the Internet), mobile telephone networks (e.g., cellular networks) such as those defined by the Third Generation Partnership Project (3GPP) families of standards (e.g., 3G, 4G, 5G, Long Term Evolution (LTE), etc.), Plain Old Telephone (POTS) networks, and wireless data networks (e.g., Institute of Electrical and Electronics Engineers (IEEE) 802.11 family of standards known as Wi-Fi®), IEEE 802.15.4 family of standards, peer-to-peer (P2P) networks, among others. In an example, the network interface device 520 can include one or more physical jacks (e.g., Ethernet, coaxial, or phone jacks) or one or more antennas to connect to the communications network 526. In an example, the network interface device 520 can include a plurality of antennas to wirelessly communicate using at least one of single-input multiple-output (SIMO), multiple-input multiple-output (MIMO), or multiple-input single-output (MISO) techniques. The term "transmission medium" shall be taken to include any intangible medium that can store, encoding or carrying instructions for execution by the machine 500, and includes digital or analog communications signals or other intangible medium to facilitate communication of such software.

Additional Examples

Example 1 is a array controller for disposable parity in a NAND device, the array controller comprising: a volatile memory; and processing circuitry to: obtain a first portion of data; store a first parity value for the first portion of data in a first memory location; update a data-to-parity table with a first entry that includes a mapping between the first portion of data and the first memory location; obtain a second portion of data; store a second parity value for the second portion of data in a second memory location that is adjacent to the first memory location; update the data-to-parity table with a second entry that including a mapping between the second portion of data and the second memory location; detect an error during a write of the first portion of data; use the first parity value via a lookup in the data-to-parity table to correct the error; and discard the first memory location and second memory location in response to a successful write of the first data portion and the second data portion.

In Example 2, the subject matter of Example 1, wherein the first data portion and the second data portion are a block as defined by the NAND device.

In Example 3, the subject matter of Example 2, wherein the first data portion is a user data block received at the NAND device.

In Example 4, the subject matter of Example 3, wherein the second data portion is a garbage collection (GC) block.

In Example 5, the subject matter of any of Examples 2-4, wherein the first parity value is an exclusive OR (XOR) between pages of the block for the first portion of data.

In Example 6, the subject matter of any of Examples 1-5, wherein the first memory location and second memory location are segments of a circular buffer.

In Example 7, the subject matter of any of Examples 1-6, wherein the first memory location and the second memory location are originally stored in volatile memory.

In Example 8, the subject matter of Example 7, wherein the processing circuitry is arranged to: flush the volatile memory to a non-volatile memory in response to a trigger; and update the entries of the data-to-parity table that correspond to flushed parity values to point to the non-volatile memory.

In Example 9, the subject matter of Example 8, wherein the trigger is a filling threshold of the volatile memory.

In Example 10, the subject matter of any of Examples 8-9, wherein the processing circuitry is arranged to receive a command to increase performance of the NAND device.

In Example 11, the subject matter of Example 10, wherein the processing circuitry is arranged to suspend the flush of the volatile memory to the non-volatile memory in response to the command to increase performance.

In Example 12, the subject matter of Example 11, wherein the volatile memory is cleared in response to the trigger.

In Example 13, the subject matter of any of Examples 1-12, wherein there is no error before the successful write of the second portion of data, and wherein the second parity value is discarded without being used.

Example 14 is a method for disposable parity in a NAND device, the method comprising: obtaining a first portion of data; storing a first parity value for the first portion of data in a first memory location; updating a data-to-parity table with a first entry that includes a mapping between the first portion of data and the first memory location; obtaining a second portion of data; storing a second parity value for the second portion of data in a second memory location that is adjacent to the first memory location; updating the data-to-parity table with a second entry that including a mapping between the second portion of data and the second memory location; detecting an error during a write of the first portion of data; using the first parity value via a lookup in the data-to-parity table to correct the error; and discarding the first memory location and second memory location in response to a successful write of the first data portion and the second data portion.

In Example 15, the subject matter of Example 14, wherein the first data portion and the second data portion are a block as defined by the NAND device.

In Example 16, the subject matter of Example 15, wherein the first data portion is a user data block received at the NAND device.

In Example 17, the subject matter of Example 16, wherein the second data portion is a garbage collection (GC) block.

In Example 18, the subject matter of any of Examples 15-17, wherein the first parity value is an exclusive OR (XOR) between pages of the block for the first portion of data.

In Example 19, the subject matter of any of Examples 14-18, wherein the first memory location and second memory location are segments of a circular buffer.

In Example 20, the subject matter of any of Examples 14-19, wherein the first memory location and the second memory location are originally stored in volatile memory.

In Example 21, the subject matter of Example 20, comprising: flushing the volatile memory to a non-volatile memory in response to a trigger; and updating the entries of the data-to-parity table that correspond to flushed parity values to point to the non-volatile memory.

In Example 22, the subject matter of Example 21, wherein the trigger is a filling threshold of the volatile memory.

In Example 23, the subject matter of any of Examples 21-22, comprising receiving a command to increase performance of the NAND device.

In Example 24, the subject matter of Example 23, wherein flushing the volatile memory to the non-volatile memory is suspended in response to the command to increase performance.

In Example 25, the subject matter of Example 24, wherein the volatile memory is cleared in response to the trigger.

In Example 26, the subject matter of any of Examples 14-25, wherein there is no error before the successful write of the second portion of data, and wherein the second parity value is discarded without being used.

Example 27 is a machine readable medium including instructions for disposable parity in a NAND device, the instructions, when executed by processing circuitry, cause the processing circuitry to perform operations comprising: obtaining a first portion of data; storing a first parity value for the first portion of data in a first memory location; updating a data-to-parity table with a first entry that includes a mapping between the first portion of data and the first memory location; obtaining a second portion of data; storing a second parity value for the second portion of data in a second memory location that is adjacent to the first memory location; updating the data-to-parity table with a second entry that including a mapping between the second portion of data and the second memory location; detecting an error during a write of the first portion of data; using the first parity value via a lookup in the data-to-parity table to correct the error; and discarding the first memory location and second memory location in response to a successful write of the first data portion and the second data portion.

In Example 28, the subject matter of Example 27, wherein the first data portion and the second data portion are a block as defined by the NAND device.

In Example 29, the subject matter of Example 28, wherein the first data portion is a user data block received at the NAND device.

In Example 30, the subject matter of Example 29, wherein the second data portion is a garbage collection (GC) block.

In Example 31, the subject matter of any of Examples 28-30, wherein the first parity value is an exclusive OR (XOR) between pages of the block for the first portion of data.

In Example 32, the subject matter of any of Examples 27-31, wherein the first memory location and second memory location are segments of a circular buffer.

In Example 33, the subject matter of any of Examples 27-32, wherein the first memory location and the second memory location are originally stored in volatile memory.

In Example 34, the subject matter of Example 33, wherein the operations comprise: flushing the volatile memory to a non-volatile memory in response to a trigger; and updating the entries of the data-to-parity table that correspond to flushed parity values to point to the non-volatile memory.

In Example 35, the subject matter of Example 34, wherein the trigger is a filling threshold of the volatile memory.

In Example 36, the subject matter of any of Examples 34-35, wherein the operations comprise receiving a command to increase performance of the NAND device.

In Example 37, the subject matter of Example 36, wherein flushing the volatile memory to the non-volatile memory is suspended in response to the command to increase performance.

In Example 38, the subject matter of Example 37, wherein the volatile memory is cleared in response to the trigger.

In Example 39, the subject matter of any of Examples 27-38, wherein there is no error before the successful write of the second portion of data, and wherein the second parity value is discarded without being used.

Example 40 is a system for disposable parity in a NAND device, the system comprising: means for obtaining a first portion of data; means for storing a first parity value for the first portion of data in a first memory location; means for updating a data-to-parity table with a first entry that includes a mapping between the first portion of data and the first memory location; means for obtaining a second portion of data; means for storing a second parity value for the second portion of data in a second memory location that is adjacent to the first memory location; means for updating the data-to-parity table with a second entry that including a mapping between the second portion of data and the second memory location; means for detecting an error during a write of the first portion of data; means for using the first parity value via a lookup in the data-to-parity table to correct the error; and means for discarding the first memory location and second memory location in response to a successful write of the first data portion and the second data portion.

In Example 41, the subject matter of Example 40, wherein the first data portion and the second data portion are a block as defined by the NAND device.

In Example 42, the subject matter of Example 41, wherein the first data portion is a user data block received at the NAND device.

In Example 43, the subject matter of Example 42, wherein the second data portion is a garbage collection (GC) block.

In Example 44, the subject matter of any of Examples 41-43, wherein the first parity value is an exclusive OR (XOR) between pages of the block for the first portion of data.

In Example 45, the subject matter of any of Examples 40-44, wherein the first memory location and second memory location are segments of a circular buffer.

In Example 46, the subject matter of any of Examples 40-45, wherein the first memory location and the second memory location are originally stored in volatile memory.

In Example 47, the subject matter of Example 46, comprising: means for flushing the volatile memory to a non-volatile memory in response to a trigger; and means for updating the entries of the data-to-parity table that correspond to flushed parity values to point to the non-volatile memory.

In Example 48, the subject matter of Example 47, wherein the trigger is a filling threshold of the volatile memory.

In Example 49, the subject matter of any of Examples 47-48, comprising means for receiving a command to increase performance of the NAND device.

In Example 50, the subject matter of Example 49, wherein the means for flushing the volatile memory to the non-volatile memory suspends a flush in response to the command to increase performance.

In Example 51, the subject matter of Example 50, wherein the volatile memory is cleared in response to the trigger.

In Example 52, the subject matter of any of Examples 40-51, wherein there is no error before the successful write of the second portion of data, and wherein the second parity value is discarded without being used.

Example 53 is at least one machine-readable medium including instructions that, when executed by processing circuitry, cause the processing circuitry to perform operations to implement of any of Examples 1-52.

Example 54 is an apparatus comprising means to implement of any of Examples 1-52.

Example 55 is a system to implement of any of Examples 1-52.

Example 56 is a method to implement of any of Examples 1-52.

The above detailed description includes references to the accompanying drawings, which form a part of the detailed description. The drawings show, by way of illustration, specific embodiments in which the invention can be practiced. These embodiments are also referred to herein as "examples". Such examples can include elements in addition to those shown or described. However, the present inventors also contemplate examples in which only those elements shown or described are provided. Moreover, the present inventors also contemplate examples using any combination or permutation of those elements shown or described (or one or more aspects thereof), either with respect to a particular example (or one or more aspects thereof), or with respect to other examples (or one or more aspects thereof) shown or described herein.

In this document, the terms "a" or "an" are used, as is common in patent documents, to include one or more than one, independent of any other instances or usages of "at least one" or "one or more." In this document, the term "or" is used to refer to a nonexclusive or, such that "A or B" can include "A but not B," "B but not A," and "A and B," unless otherwise indicated. In the appended claims, the terms "including" and "in which" are used as the plain-English equivalents of the respective terms "comprising" and "wherein". Also, in the following claims, the terms "including" and "comprising" are open-ended, that is, a system, device, article, or process that includes elements in addition to those listed after such a term in a claim are still deemed to fall within the scope of that claim. Moreover, in the following claims, the terms "first," "second," and "third," etc. are used merely as labels, and are not intended to impose numerical requirements on their objects.

In various examples, the components, controllers, processors, units, engines, or tables described herein can include, among other things, physical circuitry or firmware stored on a physical device. As used herein, "processor" means any type of computational circuit such as, but not limited to, a microprocessor, a microcontroller, a graphics processor, a digital signal processor (DSP), or any other type of processor or processing circuit, including a group of processors or multi-core devices.

The terms "wafer" and "substrate" are used herein to refer generally to any structure on which integrated circuits are formed, and also to such structures during various stages of integrated circuit fabrication. The following detailed description is, therefore, not to be taken in a limiting sense, and the scope of the various embodiments is defined only by the appended claims, along with the full scope of equivalents to which such claims are entitled.

Various embodiments according to the present disclosure and described herein include memory utilizing a vertical structure of memory cells (e.g., NAND strings of memory cells). As used herein, directional adjectives will be taken relative a surface of a substrate upon which the memory cells are formed (i.e., a vertical structure will be taken as extending away from the substrate surface, a bottom end of the vertical structure will be taken as the end nearest the substrate surface and a top end of the vertical structure will be taken as the end farthest from the substrate surface).

Operating a memory cell, as used herein, includes reading from, writing to, or erasing the memory cell. The operation of placing a memory cell in an intended state is referred to herein as "programming," and can include both writing to or erasing from the memory cell (e.g., the memory cell can be programmed to an erased state).

According to one or more embodiments of the present disclosure, a memory controller (e.g., a processor, controller, firmware, etc.) located internal or external to a memory device, is capable of determining (e.g., selecting, setting, adjusting, computing, changing, clearing, communicating, adapting, deriving, defining, utilizing, modifying, applying, etc.) a quantity of wear cycles, or a wear state (e.g., recording wear cycles, counting operations of the memory device as they occur, tracking the operations of the memory device it initiates, evaluating the memory device characteristics corresponding to a wear state, etc.)

According to one or more embodiments of the present disclosure, a memory access device can be configured to provide wear cycle information to the memory device with each memory operation. The memory device control circuitry (e.g., control logic) can be programmed to compensate for memory device performance changes corresponding to the wear cycle information. The memory device can receive the wear cycle information and determine one or more operating parameters (e.g., a value, characteristic) in response to the wear cycle information.

Method examples described herein can be machine or computer-implemented at least in part. Some examples can include a computer-readable medium or machine-readable medium encoded with instructions operable to configure an electronic device to perform methods as described in the above examples. An implementation of such methods can include code, such as microcode, assembly language code, a higher-level language code, or the like. Such code can include computer readable instructions for performing various methods. The code can form portions of computer program products. Further, the code can be tangibly stored on one or more volatile or non-volatile tangible computer-readable media, such as during execution or at other times. Examples of these tangible computer-readable media can include, but are not limited to, hard disks, removable magnetic disks, removable optical disks (e.g., compact discs and digital video disks), magnetic cassettes, memory cards or sticks, random access memories (RAMs), read only memories (ROMs), solid state drives (SSDs), Universal Flash Storage (UFS) device, embedded MMC (eMMC) device, and the like.

The above description is intended to be illustrative, and not restrictive. For example, the above-described examples (or one or more aspects thereof) can be used in combination with each other. Other embodiments can be used, such as by one of ordinary skill in the art upon reviewing the above description. It is submitted with the understanding that it will not be used to interpret or limit the scope or meaning of the claims. Also, in the above Detailed Description, various features can be grouped together to streamline the disclosure. This should not be interpreted as intending that an unclaimed disclosed feature is essential to any claim. Rather, inventive subject matter can lie in less than all features of a particular disclosed embodiment. Thus, the following claims are hereby incorporated into the Detailed Description, with each claim standing on its own as a separate embodiment, and it is contemplated that such embodiments can be combined with each other in various combinations or permutations. The scope of the invention should be determined with reference to the appended claims, along with the full scope of equivalents to which such claims are entitled.

The invention claimed is:

1. An array controller for disposable parity in a NAND device, the array controller comprising:
a volatile memory; and
processing circuitry to:
obtain a first portion of data;
store a first parity value for the first portion of data in a first memory location;
update a data-to-parity table with a first entry that includes a mapping between the first portion of data and the first memory location;
obtain a second portion of data;
store a second parity value for the second portion of data in a second memory location that is adjacent to the first memory location;
update the data-to-parity table with a second entry that including a mapping between the second portion of data and the second memory location;
detect an error during a write of the first portion of data;
use the first parity value via a lookup in the data-to-parity table to correct the error; and
discard the first memory location and second memory location in response to a successful write of the first data portion and the second data portion.

2. The array controller of claim 1, wherein the first data portion and the second data portion are a block as defined by the NAND device.

3. The array controller of claim 2, wherein the first data portion is a user data block received at the NAND device.

4. The array controller of claim 3, wherein the second data portion is a garbage collection (GC) block.

5. The array controller of claim 1, wherein the first memory location and second memory location are segments of a circular buffer.

6. The array controller of claim 1, wherein the first memory location and the second memory location are originally stored in volatile memory.

7. The array controller of claim 6, wherein the processing circuitry is arranged to:
flush the volatile memory to a non-volatile memory in response to a trigger; and
update the entries of the data-to-parity table that correspond to flushed parity values to point to the non-volatile memory.

8. The array controller of claim 1, wherein there is no error before the successful write of the second portion of data, and wherein the second parity value is discarded without being used.

9. A method for disposable parity in a NAND device, the method comprising:
obtaining a first portion of data;
storing a first parity value for the first portion of data in a first memory location;

updating a data-to-parity table with a first entry that includes a mapping between the first portion of data and the first memory location;
obtaining a second portion of data;
storing a second parity value for the second portion of data in a second memory location that is adjacent to the first memory location;
updating the data-to-parity table with a second entry that including a mapping between the second portion of data and the second memory location;
detecting an error during a write of the first portion of data;
using the first parity value via a lookup in the data-to-parity table to correct the error; and
discarding the first memory location and second memory location in response to a successful write of the first data portion and the second data portion.

10. The method of claim 9, wherein the first data portion and the second data portion are a block as defined by the NAND device.

11. The method of claim 10, wherein the first data portion is a user data block received at the NAND device.

12. The method of claim 11, wherein the second data portion is a garbage collection (GC) block.

13. The method of claim 9, wherein the first memory location and second memory location are segments of a circular buffer.

14. The method of claim 9, wherein the first memory location and the second memory location are originally stored in volatile memory.

15. The method of claim 14, comprising:
flushing the volatile memory to a non-volatile memory in response to a trigger; and
updating the entries of the data-to-parity table that correspond to flushed parity values to point to the non-volatile memory.

16. The method of claim 9, wherein there is no error before the successful write of the second portion of data, and wherein the second parity value is discarded without being used.

17. A machine readable medium including instructions for disposable parity in a NAND device, the instructions, when executed by processing circuitry, cause the processing circuitry to perform operations comprising:
obtaining a first portion of data;
storing a first parity value for the first portion of data in a first memory location;
updating a data-to-parity table with a first entry that includes a mapping between the first portion of data and the first memory location;
obtaining a second portion of data;
storing a second parity value for the second portion of data in a second memory location that is adjacent to the first memory location;
updating the data-to-parity table with a second entry that including a mapping between the second portion of data and the second memory location;
detecting an error during a write of the first portion of data;
using the first parity value via a lookup in the data-to-parity table to correct the error; and
discarding the first memory location and second memory location in response to a successful write of the first data portion and the second data portion.

18. The machine readable medium of claim 17, wherein the first data portion and the second data portion are a block as defined by the NAND device.

19. The machine readable medium of claim 18, wherein the first data portion is a user data block received at the NAND device.

20. The machine readable medium of claim 19, wherein the second data portion is a garbage collection (GC) block.

21. The machine readable medium of claim 17, wherein the first memory location and second memory location are segments of a circular buffer.

22. The machine readable medium of claim 17, wherein the first memory location and the second memory location are originally stored in volatile memory.

23. The machine readable medium of claim 22, wherein the operations comprise:
flushing the volatile memory to a non-volatile memory in response to a trigger; and
updating the entries of the data-to-parity table that correspond to flushed parity values to point to the non-volatile memory.

24. The machine readable medium of claim 17, wherein there is no error before the successful write of the second portion of data, and wherein the second parity value is discarded without being used.

* * * * *